(12) United States Patent
Liba et al.

(10) Patent No.: US 12,217,472 B2
(45) Date of Patent: Feb. 4, 2025

(54) SEGMENTING AND REMOVING OBJECTS FROM VISUAL MEDIA ITEMS

(71) Applicant: Google LLC, Mountain View, CA (US)

(72) Inventors: Orly Liba, Mountain View, CA (US); Nikhil Karnad, Mountain View, CA (US); Nori Kanazawa, Mountain View, CA (US); Yael Pritch Knaan, Mountain View, CA (US); Huizhong Chen, Mountain View, CA (US); Longqi Cai, Mountain View, CA (US)

(73) Assignee: Google LLC, Mountain View, CA (US)

( * ) Notice: Subject to any disclaimer, the term of this patent is extended or adjusted under 35 U.S.C. 154(b) by 126 days.

(21) Appl. No.: 17/968,634

(22) Filed: Oct. 18, 2022

(65) Prior Publication Data

US 2023/0118460 A1    Apr. 20, 2023

Related U.S. Application Data

(60) Provisional application No. 63/257,114, filed on Oct. 18, 2021.

(51) Int. Cl.
*G06V 10/26* (2022.01)
*G06T 5/20* (2006.01)
(Continued)

(52) U.S. Cl.
CPC ............ *G06V 10/273* (2022.01); *G06T 5/20* (2013.01); *G06T 5/77* (2024.01); *G06T 5/94* (2024.01);
(Continued)

(58) Field of Classification Search
None
See application file for complete search history.

(56) References Cited

U.S. PATENT DOCUMENTS

| 2012/0209287 A1* | 8/2012 | Zhao | A61B 34/30 382/167 |
| 2015/0269717 A1* | 9/2015 | Umit | H04N 23/81 382/155 |

(Continued)

FOREIGN PATENT DOCUMENTS

| JP | 2014-110624 | 6/2014 |
| JP | 2015-118596 | 6/2015 |

(Continued)

OTHER PUBLICATIONS

Li et al.; "Transmission line detection in aerial images: An instance segmentation approach based on multitask neural networks;" Signal Processing: Image Communication 96 (2021) 116278; Elsevier B.V.; 9 pages (Year: 2021).*

(Continued)

*Primary Examiner* — Edward Martello
(74) *Attorney, Agent, or Firm* — IP Spring

(57) ABSTRACT

A media application generates training data that includes a first set of visual media items and a second set of visual media items, where the first set of visual media items correspond to the second set of visual items and include distracting objects that are manually segmented. The media application trains a segmentation machine-learning model based on the training data to receive a visual media item with one or more distracting objects and to output a segmentation mask for one or more segmented objects that correspond to the one or more distracting objects.

20 Claims, 14 Drawing Sheets

(9 of 14 Drawing Sheet(s) Filed in Color)

(51) Int. Cl.
  G06T 5/77    (2024.01)
  G06T 5/94    (2024.01)
  G06T 11/00   (2006.01)
  G06V 10/764  (2022.01)
  G06V 10/774  (2022.01)
  G06V 20/20   (2022.01)

(52) U.S. Cl.
  CPC ............ *G06T 11/00* (2013.01); *G06V 10/764* (2022.01); *G06V 10/774* (2022.01); *G06V 20/20* (2022.01); *G06T 2200/24* (2013.01)

(56) References Cited

U.S. PATENT DOCUMENTS

| | | | |
|---|---|---|---|
| 2018/0005063 | A1 | 1/2018 | Chan et al. |
| 2020/0125927 | A1 | 4/2020 | Kim |
| 2020/0364913 | A1 | 11/2020 | Bradski |
| 2021/0279595 | A1 | 9/2021 | Sridhar et al. |
| 2022/0129670 | A1* | 4/2022 | Lin ................ G06V 10/50 |
| 2022/0375100 | A1* | 11/2022 | Qi ................ G06T 7/187 |

FOREIGN PATENT DOCUMENTS

| | | |
|---|---|---|
| JP | 2019-053732 | 4/2019 |
| JP | 2021-521982 | 8/2021 |

OTHER PUBLICATIONS

Abdelfattah et al.; "TTPLA: An Aerial-Image Dataset for Detection and Segmentation of Transmission Towers and Power Lines;" Computer Vision Foundation; ACCV 2020; 17 pages (Year: 2020).*

Zhang et al.; "Detecting Power Lines in UAV Images with Convolutional Features and Structured Constraints;" Remote Sensing; MDPI, Basel, Switzerland; 18 pages (Year: 2019).*

Madaan et al.; "Wire Detection using Synthetic Data and Dilated Convolutional Networks for Unmanned Aerial Vehicles;" 2017 IEEE/RSJ International Conference on Intelligent Robots and Systems (IROS); Sep. 24-28, 2017, Vancouver, BC, Canada; 8 pages (Year: 2017).*

EPO, International Search Report for International Patent Application No. PCT/US2022/047033, Jan. 26, 2023, 3 pages.

EPO, Written Opinion for International Patent Application No. PCT/US2022/047033, Jan. 26, 2023, 8 pages.

Saurav, et al., "Power Line Segmentation in Aerial Images Using Convolutional Neural Networks", 16th European Conference—Computer Vision—ECCV 2020, Cornell University Library, Nov. 25, 2019, pp. 623-632.

Yin, et al., "A Co-Random Walks Segmentation Method for Aerial Insulator Video Images", 2019 12th International Congress on Image and Signal Processing, BioMedical Engineering and Informatics (CISP-BMEI), IEEE, 2019, pp. 1-9.

Abdelfattah, et al., "TTPLA: an aerial-image dataset for detection and segmentation of transmission towers and power lines", Proceedings of the Asian Conference on Computer Vision, 2020, 17 pages.

Hong, et al., "Weakly Supervised Learning with Deep Convolutional Neural Networks for Semantic Segmentation: Understanding Semantic Layout of Images with Minimum Human Supervision", IEEE Signal Processing Magazine 34.6, 2017, pp. 39-49.

JPO, Office Action for Japanese Patent Application No. 2023-561387, Sep. 17, 2024, 8 pages.

Li, et al., "Transmission line detection in aerial images: an instance segmentation approach based on multitask neural networks", Signal Processing: Image Communication 96: 116278, 2021.

Madaan, et al., "Wire detection using synthetic data and dilated convolutional networks for unmanned aerial vehicles", 2017 IEEE/RSJ International Conference on Intelligent Robots and Systems (IROS), 2017, 8 pages.

Miyayama, et al., "An image coding method based on a foreground and a background", IEICE Technical Report; IEICE Tech. Rep. 115.335, 2015, pp. 5-8.

Niwa, et al., "FPGA Implementation of Semantic Segmentation on LWIR Images for Autonomous Robot", IEICE Technical Report; IEICE Tech. Rep. 120.339, 2021, pp. 101-106.

* cited by examiner

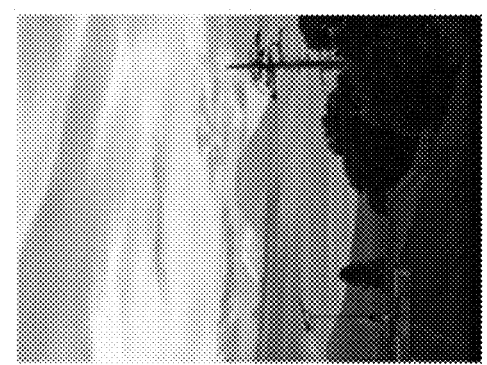
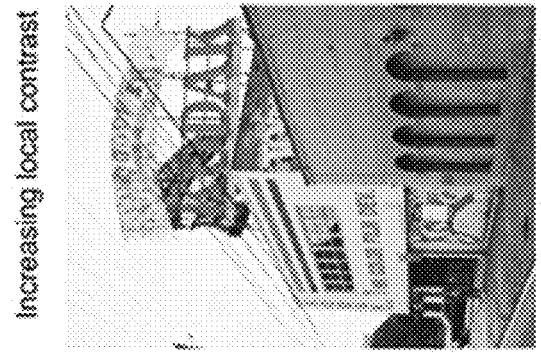
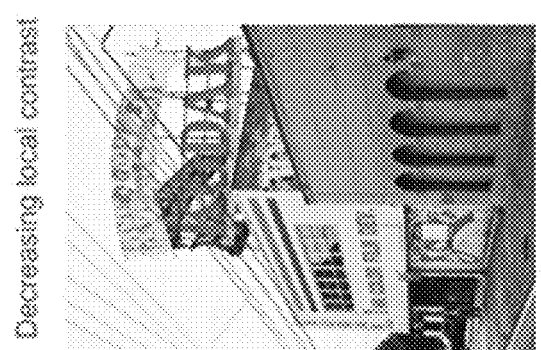
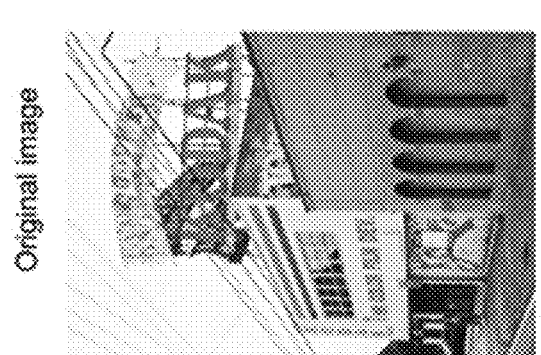
FIG 4

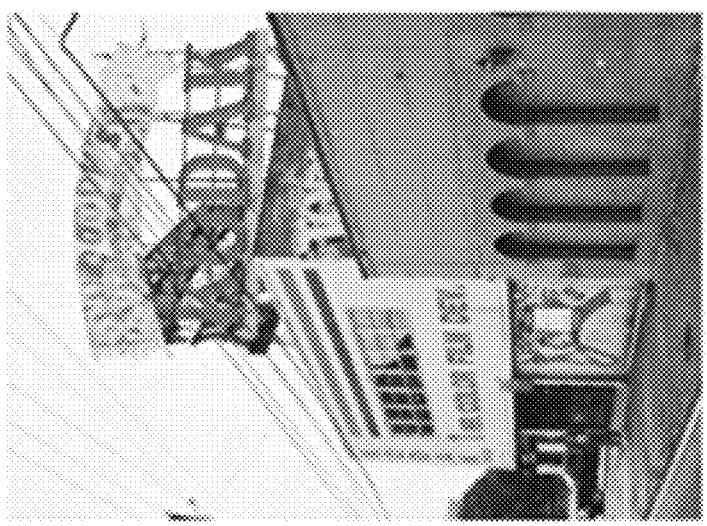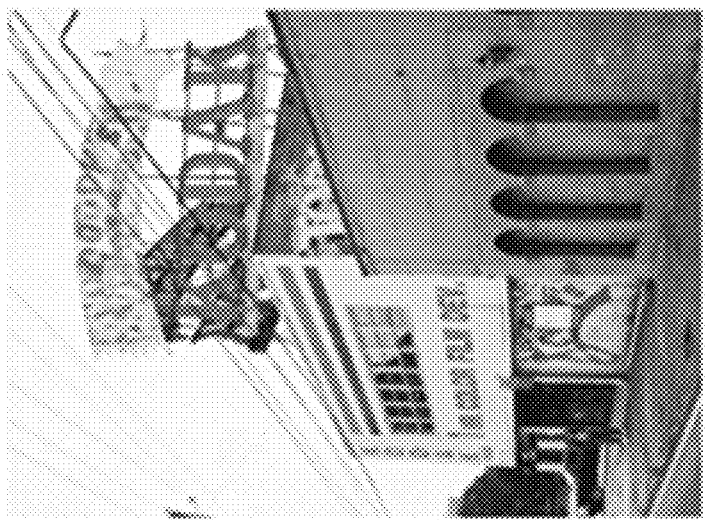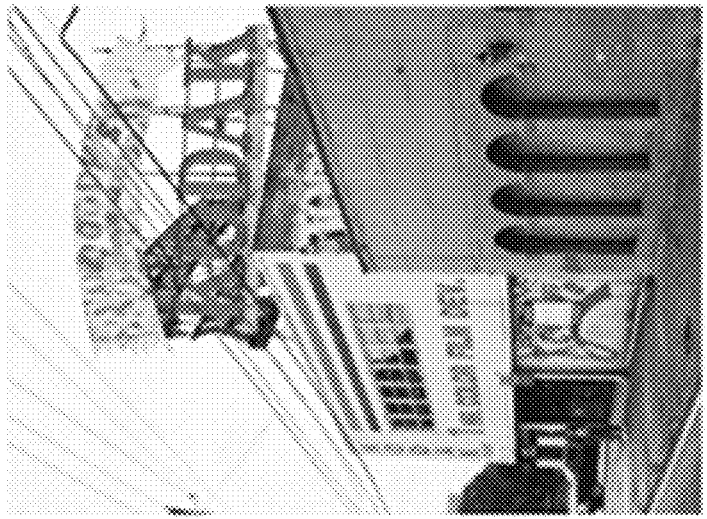
FIG 5

FIG 7

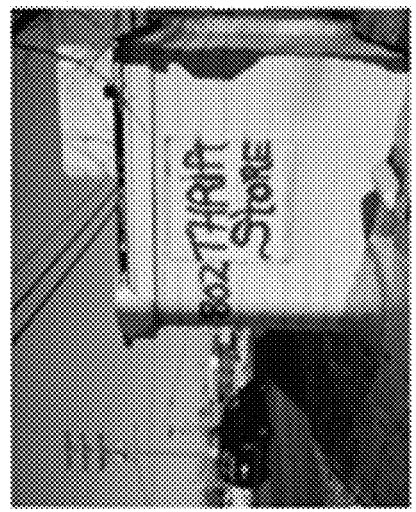
FIG 9

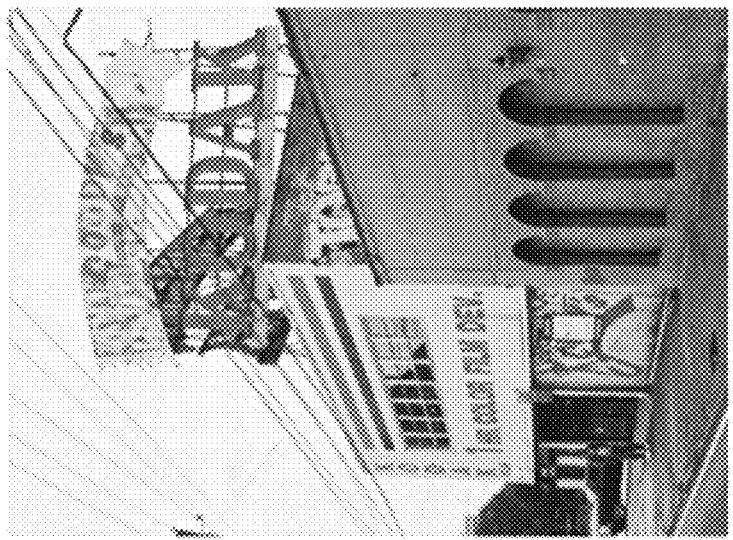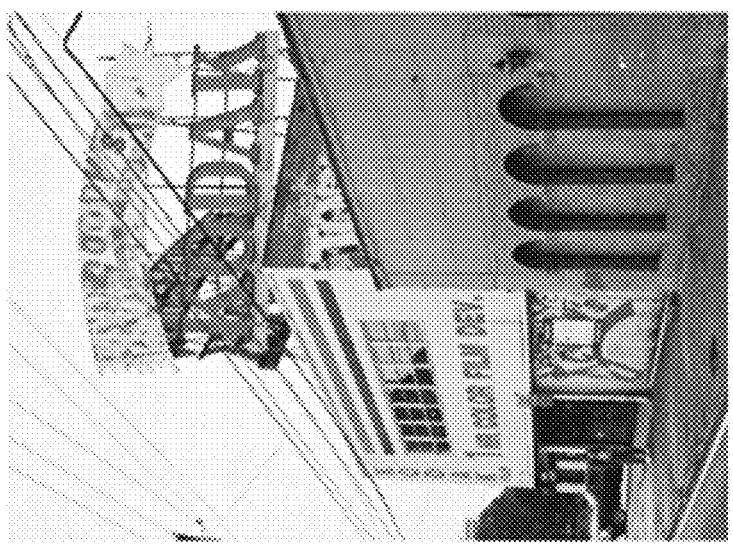
FIG 12

1300

Generate training data that includes a first set of media items and a second set of media items, where the first set of media items correspond to the second set of media items and also include distracting objects that are manually segmented 1302

Train a segmentation machine-learning model based on the training data to receive a media image with one or more distracting objects and to output a segmentation mask for one or more segmented objects that correspond to the one or more distracting objects 1304

FIG 13

SEGMENTING AND REMOVING OBJECTS FROM VISUAL MEDIA ITEMS

CROSS-REFERENCE TO RELATED APPLICATIONS

The present application claims priority to U.S. Provisional Patent Application No. 63/257,114, filed on Oct. 18, 2021 and titled "Segmenting and Removing Objects from Media Items," which is incorporated by reference herein in its entirety.

BACKGROUND

The user-perceived quality of visual media items such as images (static images, images with selective motion, etc.) and videos can be improved by removing certain objects that distract from the focus of the media items. The distracting objects can be manually removed, but the task can be arduous and incomplete. Further, the distracting objects are difficult to automatically remove from the media items because such removal may result in images where additional objects or portions of objects (that are incorrectly identified as distracting objects) are also removed; overtriggering and unrealistic results where additional objects are removed; or incomplete segmentation where portions of a removed object are still visible.

Users can employ manual image or video editing techniques to remove distracting objects. However, this task can be arduous and incomplete. Further, automatic removal of a distracting object is difficult since it may result in false positives where additional objects or portions of objects are also removed or incomplete segmentation results in portions of the removed object still being visible.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes generating training data that includes a first set of media items and a second set of media items, where the first set of media items correspond to the second set of media items and include distracting objects that are manually segmented. The method further includes training a segmentation machine-learning model based on the training data to receive a media item with one or more distracting objects and to output a segmentation mask for one or more segmented objects that correspond to the one or more distracting objects.

In some embodiments, the one or more distracting objects are powerlines and the method further includes identifying one or more media items from the first set of media items that include one or more broken powerlines and augmenting the one or more media items to correct the one or more broken powerlines in the training data. In some embodiments, augmenting the one or more media items to correct the one or more broken powerlines includes: modifying a local contrast in the one or more media items to generate corresponding one or more enhanced media items and blending portions of the one or more media items with portions of the corresponding one or more enhanced media items. In some embodiments, the local contrast is modified using a gain curve that adds two bias curves together. In some embodiments, generating training data includes augmenting the one or more media items by applying a dilation to a segmentation mask of the one or more distracting objects. In some embodiments, the one or more distracting objects are organized into categories, the categories including at least one selected from the group of powerlines, power poles, towers, and combinations thereof. In some embodiments, training the segmentation machine-learning model includes: generating a high-capacity machine-learning model based on the training data and distilling the high-capacity machine-learning model to a trained segmentation machine-learning model by running inference on the training data that is segmented by the high-capacity machine-learning model. In some embodiments, the training data further includes synthesized images with the distracting objects added in front of outdoor environment objects.

In some embodiments, a computer-implemented method to remove a distracting object from a media item includes: receiving a media item from a user, identifying one or more distracting objects in the media item, providing the media item to a trained segmentation machine-learning model, outputting, with the trained segmentation machine-learning model, a segmentation mask for the one or more distracting objects in the media item, and inpainting a portion of the media item that matches the segmentation mask to obtain an output media item, where the one or more distracting objects are absent from the output media item.

In some embodiments, the one or more distracting objects are organized into categories, the categories including at least one selected from the group of powerlines, power poles, towers, and combinations thereof. In some embodiments, the method further includes providing a suggestion to a user to remove the one or more distracting objects from the media item. In some embodiments, the trained segmentation machine-learning model is trained using training data that includes a first set of media items and a second set of media items, wherein the first set of media items correspond to the second set of media items and include distracting objects that are manually segmented.

In some embodiments, a non-transitory computer-readable medium with instructions stored thereon that, when executed by one or more computers, causes the one or more computers to perform operations, the operations comprising: generating training data that includes a first set of media items and a second set of media items, wherein the first set of media items correspond to the second set of media items and include distracting objects that are manually segmented and training a segmentation machine-learning model based on the training data to receive a media item with one or more distracting objects and to output a segmentation mask for one or more segmented objects that correspond to the one or more distracting objects.

In some embodiments, the one or more distracting objects are powerlines and the operations further include: identifying one or more media items from the first set of media items that include one or more broken powerlines and augmenting the one or more media items to correct the one or more broken powerlines in the training data. In some embodiments, augmenting the one or more media items to correct the one or more broken powerlines includes: modifying a local contrast in the one or more media items to generate corresponding one or more enhanced media items and blending portions of the one or more media items with portions of the corresponding one or more enhanced media items. In some embodiments, the local contrast is modified using a gain curve that adds two bias curves together. In some embodiments, generating training data includes augmenting the one or more media items by applying a dilation to a segmentation mask of the one or more distracting objects. In some embodiments, the one or more distracting objects are organized into categories, the categories including at least one selected from the group of powerlines, power poles, towers, and combinations thereof. In some embodiments, training the segmentation machine-learning model includes: generating a high-capacity machine-learning model based on the training data and distilling the high-capacity machine-learning model to a trained segmentation machine-learning model by running inference on the training data that is segmented by the high-capacity machine-learning model. In some embodiments, the training data further includes synthesized images with the distracting objects added in front of outdoor environment objects.

The techniques described in the specification advantageously describes a media application that includes a trained segmentation machine-learning model that overcomes technical difficulties to identify distracting objects in a media item.

BRIEF DESCRIPTION OF THE DRAWINGS

The application file contains at least one drawing executed in color. Copies of this patent or patent application publication with color drawing(s) Till be provided by the Office upon request and payment of the necessary fee.

FIG. 4 illustrates example images with different local contrasts, according to some embodiments described herein.

FIG. 5 illustrates an example original image, an augmented image, and a blended image, according to some embodiments described herein.

FIG. 7 illustrates an example original image and an example image with increased local contrast, according to some embodiments described herein.

FIG. 9 illustrates example images with varying brightness, according to some embodiments described herein.

FIG. 12 illustrates an example original image and an example image with local blurring and a dilated segmentation mask, according to some embodiments described herein.

FIG. 13 illustrates a flowchart of an example method to train a segmentation machine-learning model, according to some embodiments described herein.

DETAILED DESCRIPTION

Example Environment 100

Figure 1:
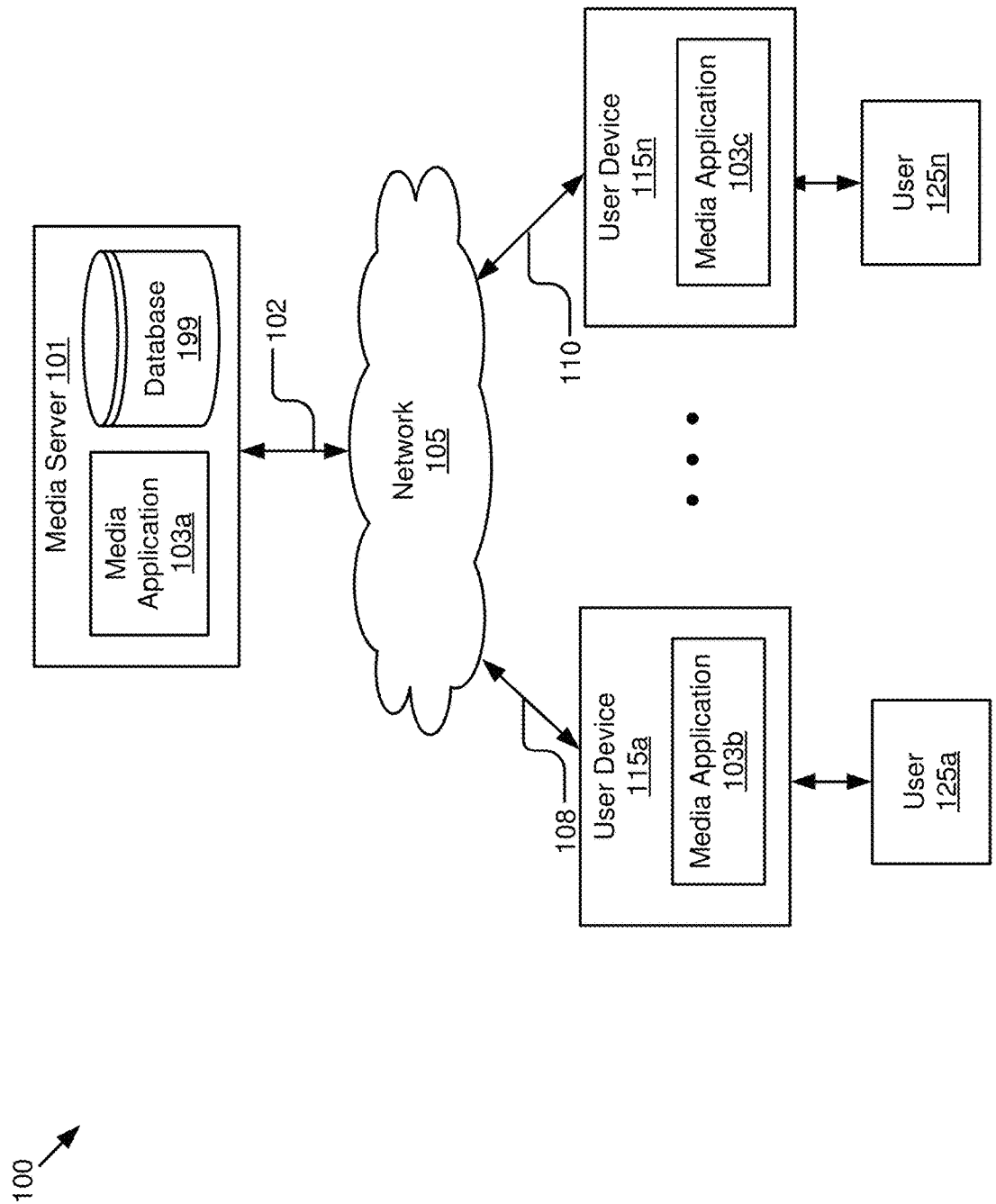
FIG. 1 is a block diagram of an example network environment to remove distracting objects from media items, according to some embodiments described herein.

FIG. 1 illustrates a block diagram of an example environment 100. In some embodiments, the environment 100 includes a media server 101, a user device 115a, and a user device 115n coupled to a network 105. Users 125a, 125n may be associated with respective user devices 115a, 115n. In some embodiments, the environment 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The media server 101 may include a processor, a memory, and network communication hardware. In some embodiments, the media server 101 is a hardware server. The media server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the media server 101 sends and receives data to and from one or more of the user devices 115a, 115n via the network 105. The media server 101 may include a media application 103a and a database 199.

The database 199 may store machine-learning models, training data sets, images, etc. The database 199 may, upon receipt of user consent, store social network data associated with users 125, user preferences for the users 125, etc.

The user device 115 may be a computing device that includes a memory coupled to a hardware processor. For example, the user device 115 may include a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. The media application 103 may be stored as media application 103b on the user device 115a and/or media application 103c on the user device 115n. Signal lines 108 and 110 may be wired connections, such as Ethernet, coaxial cable, fiber-optic cable, etc., or wireless connections, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

The media application 103 may be stored on the media server 101 and/or the user device 115. In some embodiments, the operations described herein are performed on the media server 101 or the user device 115. In some embodiments, some operations may be performed on the media server 101 and some may be performed on the user device 115. Performance of operations is in accordance with user settings. For example, the user 125a may specify settings that operations are to be performed on their respective device 115a and not on the media server 101. With such settings, operations described herein are performed entirely on user device 115a and no operations are performed on the media server 101. Further, a user 125a may specify that images and/or other data of the user is to be stored only locally on a user device 115a and not on the media server 101. With such settings, no user data is transmitted to or stored on the media server 101. Transmission of user data to the media server 101, any temporary or permanent storage of such data by the media server 101, and performance of operations on such data by the media server 101 are performed only if the user has agreed to transmission, storage, and performance of operations by the media server 101. Users are provided with options to change the settings at any time, e.g., such that they can enable or disable the use of the media server 101.

Machine learning models (e.g., neural networks or other types of models), if utilized for one or more operations, are stored and utilized locally on a user device 115, with specific user permission. Server-side models are used only if permitted by the user. Model training is performed using a synthesized data set, as described below with reference to FIG. 5. Further, a trained model may be provided for use on a user device 115. During such use, if permitted by the user 125, on-device training of the model may be performed. Updated model parameters may be transmitted to the media server 101 if permitted by the user 125, e.g., to enable federated learning. Model parameters do not include any user data.

The media application 103 trains a segmentation machine-learning model to remove one or more distracting objects from a media item by generating training data that includes a first set of media items and a second set of media items, wherein the first set of media items correspond to the second set of media items and include distracting objects that are manually segmented. Herein, a distracting object is an object that falls into a predetermined category of object that is frequently undesired in images and that the technology presented herein enables to seamlessly remove from the image by replacing the "distracting object" with a background of the same. Examples of distracting objects used for illustration herein are powerlines, poles, or towers. The media application 103 may train the segmentation machine-learning model based on the training data to receive a media item with one or more distracting objects and to output a segmentation mask for one or more segmented objects that correspond to the one or more distracting objects.

In some embodiments, the media application 103 may be implemented using hardware including a central processing unit (CPU), a field-programmable gate array (FPGA), an application-specific integrated circuit (ASIC), machine learning processor/co-processor, any other type of processor, or a combination thereof. In some embodiments, the media application 103a may be implemented using a combination of hardware and software.

Example Computing Device 200

Figure 2:
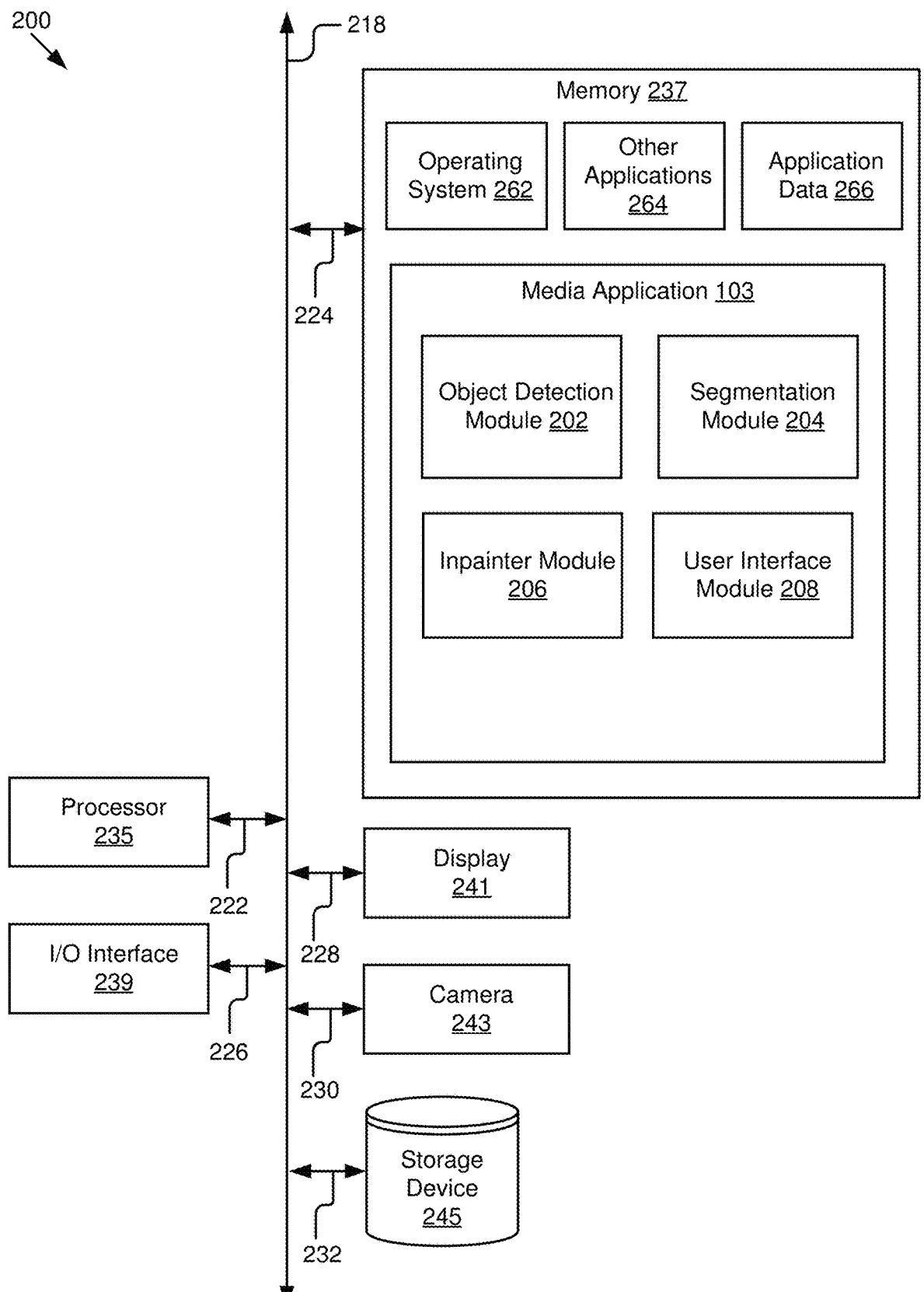
FIG. 2 is a block diagram of an example computing device to remove distracting objects from media items, according to some embodiments described herein.

FIG. 2 is a block diagram of an example computing device 200 that may be used to implement one or more features described herein. Computing device 200 can be any suitable computer system, server, or other electronic or hardware device. In one example, computing device 200 is a media server 101 used to implement the media application 103a. In another example, computing device 200 is a user device 115.

In some embodiments, computing device 200 includes a processor 235, a memory 237, an input/output (I/O) interface 239, a display 241, a camera 243, and a storage device 245 all coupled via a bus 218. The processor 235 may be coupled to the bus 218 via signal line 222, the memory 237 may be coupled to the bus 218 via signal line 224, the I/O interface 239 may be coupled to the bus 218 via signal line 226, the display 241 may be coupled to the bus 218 via signal line 228, the camera 243 may be coupled to the bus 218 via signal line 230, and the storage device 245 may be coupled to the bus 218 via signal line 232.

Processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 235 may include one or more co-processors that implement neural-network processing. In some embodiments, processor 235 may be a processor that processes data to produce probabilistic output, e.g., the output produced by processor 235 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 237 is provided in computing device 200 for access by the processor 235, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including a media application 103.

The memory 237 may include an operating system 262, other applications 264, and application data 266. Other applications 264 can include, e.g., an image library application, an image management application, an image gallery application, communication applications, web hosting engines or applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

The application data 266 may be data generated by the other applications 264 or hardware of the computing device 200. For example, the application data 266 may include images used by the image library application and user actions identified by the other applications 264 (e.g., a social networking application), etc.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 245), and input/output devices can communicate via I/O interface 239. In some embodiments, the I/O interface 239 can connect to interface devices such as input devices (keyboard, pointing device, touchscreen, microphone, scanner, sensors, etc.) and/or output devices (display devices, speaker devices, printers, monitors, etc.).

Some examples of interfaced devices that can connect to I/O interface 239 can include a display 241 that can be used to display content, e.g., images, video, and/or a user interface of an output application as described herein, and to receive touch (or gesture) input from a user. For example, display 241 may be utilized to display a user interface that includes a graphical guide on a viewfinder. Display 241 can include any suitable display device such as a liquid crystal display (LCD), light emitting diode (LED), or plasma display screen, cathode ray tube (CRT), television, monitor, touchscreen, three-dimensional display screen, or other visual display device. For example, display 241 can be a flat display screen provided on a mobile device, multiple display screens embedded in a glasses form factor or headset device, or a monitor screen for a computer device.

Camera 243 may be any type of image capture device that can capture media items, including images and/or video. In some embodiments, the camera 243 captures images or video that the I/O interface 239 provides to the media application 103.

The storage device 245 stores data related to the media application 103. For example, the storage device 245 may store a training data set that includes labeled images, a machine-learning model, output from the machine-learning model, etc.

FIG. 2 illustrates an example media application 103, stored in memory 237, that includes an object detection module 202, a segmentation module 204, an inpainter module 206, and a user interface module 208.

The object detection module 202 identifies distracting objects in media items. In some embodiments, the object detection module 202 includes a set of instructions executable by the processor 235 to identify the distracting objects in media items. In some embodiments, the object detection module 202 is stored in the memory 237 of the computing device 200 and can be accessible and executable by the processor 235.

In some embodiments, the object detection module 202 receives a media item. The media item may be received from the camera 243 of the computing device 200, from application data 266, or from the media server 101 via the I/O interface 239. In various embodiments, the media item may be an image, a video, a series of images (e.g., a GIF), etc.

The object detection module 202 detects one or more distracting objects in the media item. In some embodiments, the object detection module 202 categorizes the distracting objects into categories that include powerlines, power poles, or towers. In some embodiments, the object detection module 202 uses object priors to identify the distracting objects where object priors are categories of objects with specified parameters. For example, the object priors may include sets of images that are identified as corresponding to powerlines, power poles, towers, etc. In some embodiments, the object detection module 202 uses an objection detection machine-learning model that is trained to receive media items as input and output an identification of the distracting objects in the media items.

In some embodiments, the segmentation module 204 includes (and optionally, also performs training for) a trained model that is herein referred to as a segmentation machine-learning model. In some embodiments, the segmentation module 204 is configured to apply the machine-learning model to input data, such as application data 266 (e.g., a media item captured by the user device 115), and to output a segmentation mask. In some embodiments, the segmentation module 204 may include code to be executed by processor 235. In some embodiments, the segmentation module 204 is stored in the memory 237 of the computing device 200 and can be accessible and executable by the processor 235.

In some embodiments, the segmentation module 204 may specify a circuit configuration (e.g., for a programmable processor, for a field programmable gate array (FPGA), etc.) enabling processor 235 to apply the segmentation machine-learning model. In some embodiments, the segmentation module 204 may include software instructions, hardware instructions, or a combination. In some embodiments, the segmentation module 204 may offer an application programming interface (API) that can be used by the operating system 262 and/or other applications 264 to invoke the segmentation module 204, e.g., to apply the segmentation machine-learning model to application data 266 to output the segmentation mask.

In some embodiments, the segmentation module 204 uses training data to train a segmentation machine-learning model. Training data may be obtained from any source, e.g., a data repository specifically marked for training, data for which permission is provided for use as training data for machine learning, etc. In some embodiments, the training may occur on the media server 101 that provides the training data directly to the user device 115, the training occurs locally on the user device 115, or a combination of both. As discussed in greater detail below, in some embodiments, the training occurs on the media server 101 and a simplified version of the trained segmentation machine-learning model is used locally on the user device 115.

In some embodiments, the training data includes a first set of media items and a second set of media items. The first set of media items are similar to the second set of media items except that they include distracting objects that are manually segmented. For example, the distracting objects may be manually annotated and segmented by users. In some embodiments, the training data categorizes distracting objects into three distinct categories for powerlines, poles, and towers. In some embodiments, the training data may include additional categories, such as traffic lights.

In some embodiments, the training data may include synthesized data generated for the purpose of training, such as data that is not based on activity in the context that is being trained, e.g., data generated from simulated or computer-generated images/videos, etc. The training data may include synthesized media items with distracting objects. In some embodiments, the synthesized media includes distracting objects added in front of outdoor environment objects, such as powerlines, power poles, and/or towers that are added to images taken in outdoor environments.

Figure 3:
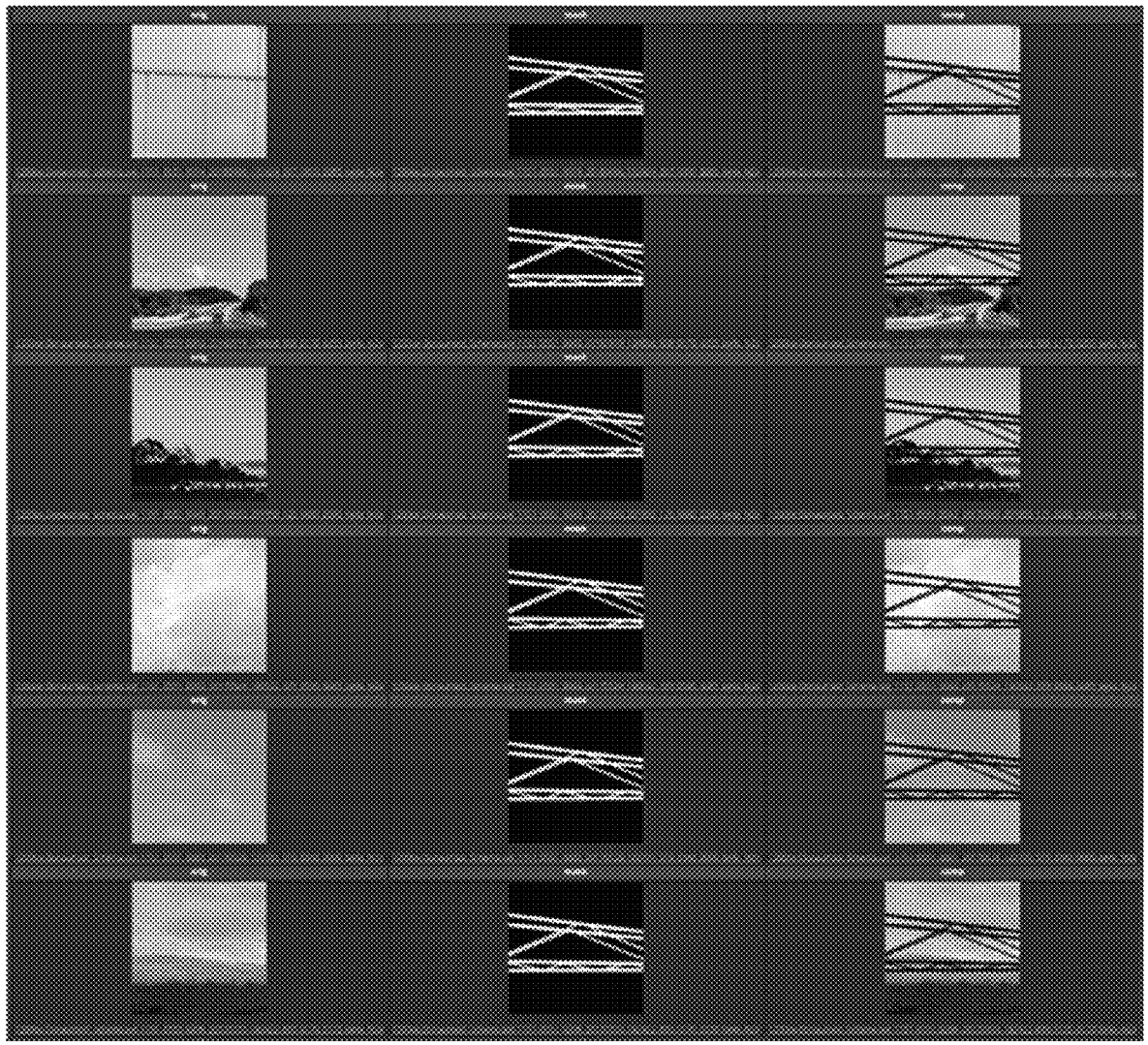
FIG. 3 illustrates examples to generate synthesized images for training a segmentation machine-learning model, according to some embodiments described herein.

Turning to FIG. 3, examples 300 for generating synthesized images for training a segmentation machine-learning model are illustrated. The images in the first column are original images, the images in the second column are segmentation masks, and the images in the third column show the corresponding synthesized results. In this example, the synthesized images include synthesized image patches that are synthesized to appear realistic. For example, the synthesized image patches include distracting objects, such as power lines, that occlude a subject of the image and comprise 1%-30% of a media item; images with distracting objects in the background where 60% or more of the sky is included in the image; and compositing foreground occluders over background. Each synthesized image patch includes a composited result, a segmentation mask of an occluder (i.e., a distracting object that occludes the background), and a ground truth background.

In some embodiments, where the segmentation mask breaks (e.g., on a powerline break) or is faint when the color changes in certain intermediate portions (e.g., due to lighting or other reasons), the training data is augmented. In another example, the segmentation mask may fail to identify a sign that is attached to a pole. The segmentation module 204 augments the training data to improve the quality of the training of the segmentation machine-learning model by making the distracting objects more difficult to detect.

In some embodiments, where the continuity of the powerlines is assumed, the segmentation module 204 fits line models on the powerlines and connects the broken parts. In some embodiments where the background is complex, the segmentation module 204 generates synthesized media items by adding power lines and poles in front of trees, instead of using only trees for training.

The segmentation module 204 may augment the training data in order to make the distracting objects less visible. In some embodiments, the training data includes broken powerlines, which are more difficult to segment because it can be difficult to detect the difference between a broken powerline and a new object. In some embodiments, the segmentation module 204 performs augmentation of the powerlines to improve segmentation of one or more broken powerlines in the training data. In other words, the segmentation module 204 corrects the one or more broken power lines in the media item.

In some embodiments, the segmentation module 204 performs augmentation of the powerlines (or other distracting objects) by changing the contrast. The contrast may either be increased or decreased depending on the attributes of the media item. The contrast may apply locally to target the one or more distracting objects or globally to the entire media item.

Turning to FIG. 4, example images 400 are illustrated that include different local contrasts. For example, in the first row 405 of images below, decreasing the local contrast makes it more difficult to identify the powerlines for segmentation because they are similar to the mountains and clouds in the background. In the second row 410 of images in FIG. 4, increasing the local contrast makes it more difficult to identify the power lines because they turn the same shade of black as portions of the KODAK sign. As a result, the segmentation module 204 modifies the contrast either by decreasing the contrast or increasing the contrast depending on the media item to increase difficulty and thereby improve the training of the segmentation machine-learning model.

In some embodiments, the segmentation module 204 blends an augmented image with the original media item with a checkerboard mask in order to increase the randomness of the augmentation. In some embodiments, the checkerboard mask $W=I(x \neq y)$ is generated using the following equation:

$$f_{cb}(I, I_a) = [1(x \neq y)I] + [1(x=y)I_a] \quad \text{(Eq. 1)}$$

where $f_{cb}$ is a checkerboard function, I is the image, and $I_a$ is the augmented image.

FIG. 5 illustrates an example 500 of an original image, an augmented image, and a blended image. As mentioned with reference to FIG. 4, the augmented image is generated by decreasing the local contrast. Thus, the blended image is a random mix of the original image and an augmented version with decreased local contrast.

In some embodiments, the segmentation module 204 modifies the contrast by applying a gain curve on the image where the gain curve is defined by adding together two bias curves. The bias curve is defined by the following equation:

$$f_b(x;b) = x/[(1/b-2)(1-x)+1] \quad \text{(Eq. 2)}$$

where $f_b$ is the bias curve function and b is a tunable parameter that falls in (0,1). When $b < \frac{1}{2}$, the function is concave, and otherwise convex.

Figure 6:
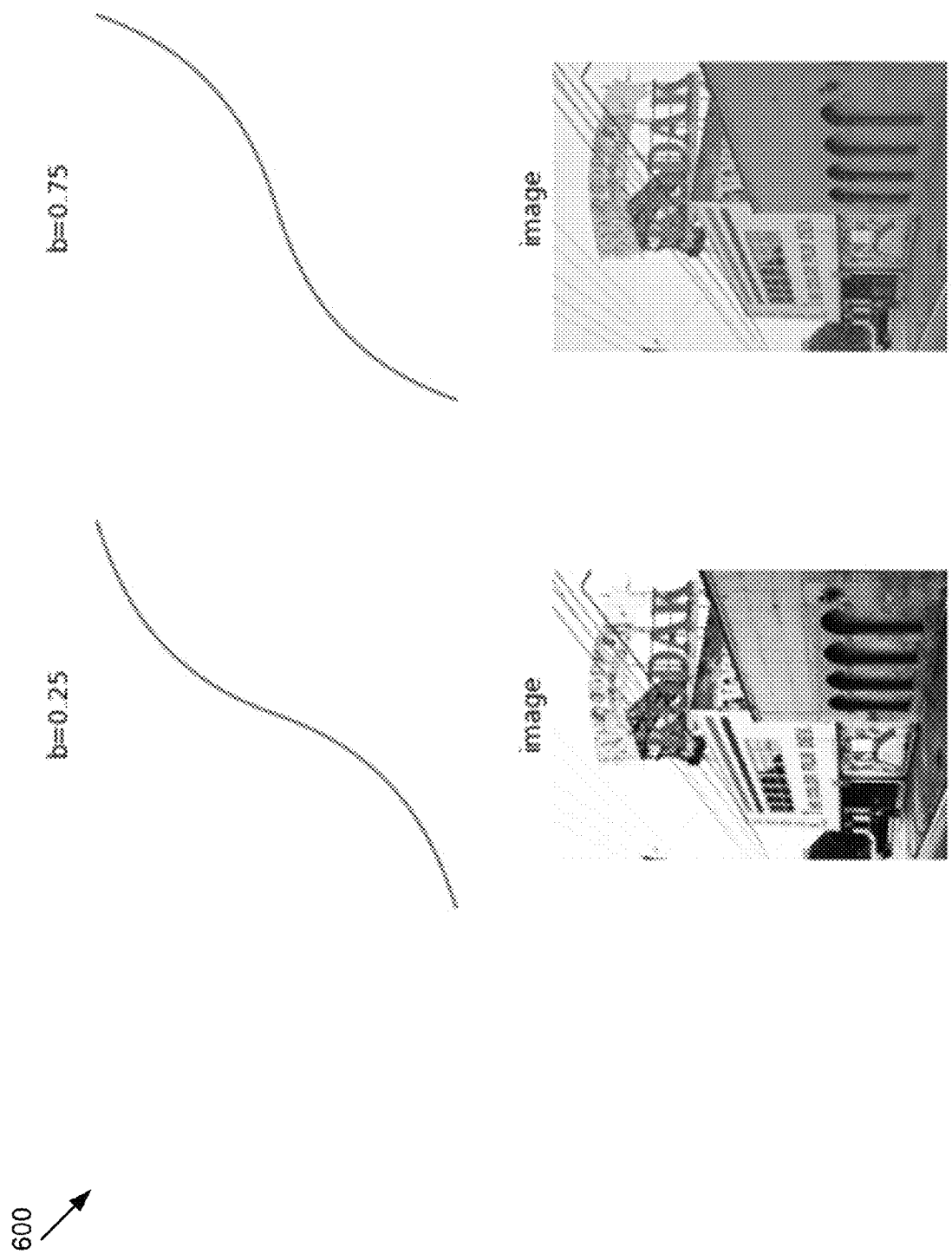
FIG. 6 is an example of the bias curves and how they affect the contrast of the images, according to some embodiments described herein.

The following gain curve equation adds two bias curves together:

$$f_g(x;b) = 1\left(x < \frac{1}{2}\right)\left[\frac{f_b(2x;b)}{2}\right] + 1\left(x \geq \frac{1}{2}\right)\left[\frac{f_b(2x-1;1-b)}{2} + \frac{1}{2}\right] \quad \text{(Eq. 3)}$$

Where $f_g$ is the function for the gain curve. When $b < \frac{1}{2}$, the function is s-shaped, and the function increases the contrast when the segmentation module 204 applies a b of less than 0.5 on the image. Otherwise, the b value results in a decreased contrast. FIG. 6 is an example 600 of the gain curve function and how the value of b affects the contrast of the images. When b=0.25, the contrast is increased; when b=0.75, the contrast is decreased.

To change the contrast only around the distracting object (e.g., the powerline), the segmentation module 204 may make b a function of the mask value m. When m=0, the segmentation module 204 makes the function return ½ so the gain function has no effect. The segmentation module 204 still needs a $b_0$ which indicates the b value at full strength, i.e., when m=1:

$$b(m;b_0) = \frac{1}{2} + (b_0 - \frac{1}{2})m \quad \text{(Eq. 4)}$$

FIG. 7 illustrates examples 700 of an original image and an image with increased local contrast that was generated using equation 4 above.

Figure 8:
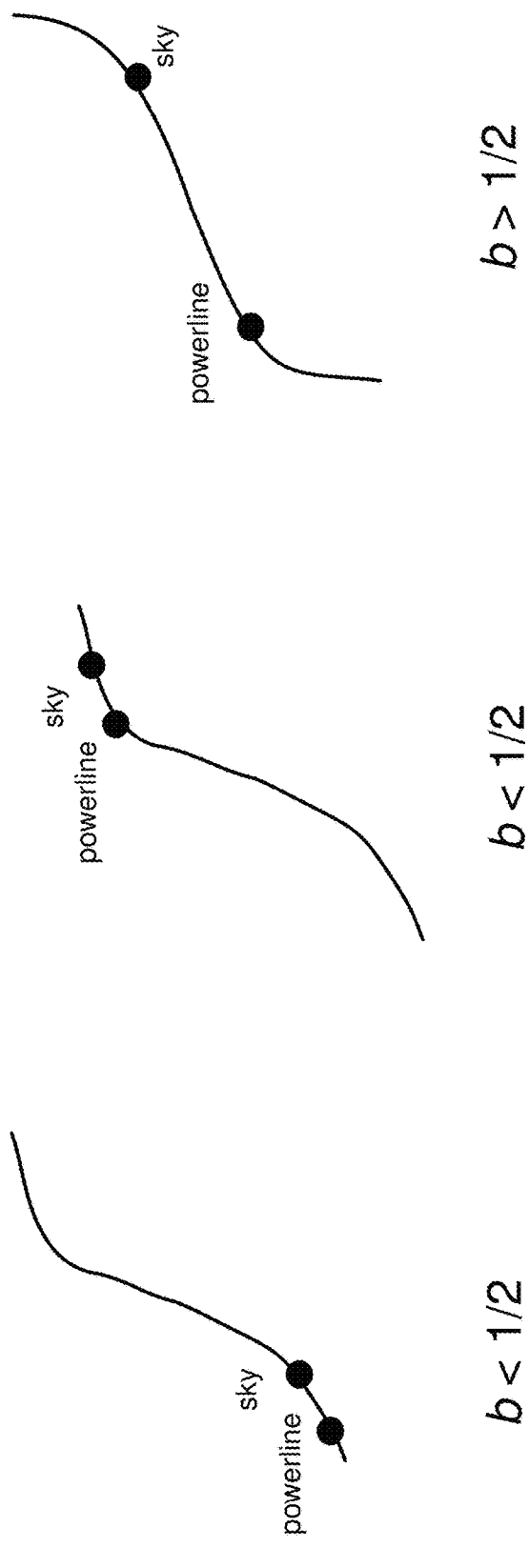
FIG. 8 illustrates examples of the contrast between different objects as a function of the bias curve, according to some embodiments described herein.

In some embodiments, the segmentation module 204 increases the local contrast when the contrast should actually be decreased. This is because the definition of contrast is not the contrast within the local region, but the contrast of the local region against the whole image. The goal of data augmentation is to make the powerline less differentiable from the surrounding sky pixels, in which case the segmentation module 204 decreases the contrast within the local region. The segmentation module 204 adjusts the local contrast against the global image to obtain good results. FIG. 8 illustrates examples 800 of the contrast between different objects as a function of the bias curve.

In some embodiments, the segmentation module 204 simulates a brightness change by applying a gradient change of contrast in a segmentation mask. In some embodiments, the segmentation module 204 applies a global brightness to a media item to hide the distracting object in the background. Turning to FIG. 9, example 900 includes images with varying brightness. FIG. 9 includes the original image, a darkened image, and a brightened image. The powerlines in the darkened image are easier to detect. As a result, the segmentation module 204 applies a global brightness which increases the difficulty of detecting the powerlines.

In some embodiments, the segmentation module 204 changes the global brightness of an image using a bias curve.

Figure 10:
FIG. 10 illustrates examples of images affected by different bias curves, according to some embodiments described herein.

When b<½, it darkens the image; otherwise, it brightens the image. FIG. 10 illustrates examples 1000 of how the different bias curves affect the images.

In some embodiments, the segmentation module 204 augments the training data by applying a dilation mask to a segmentation mask of distracting objects in media items. The dilation is used to account for inaccuracies in the dilation mask and to create a soft transition between distracting object pixels and background pixels.

Instead of doing binary dilation, in some embodiments, the segmentation module 204 applies a soft dilation to allow transition with the following equation:

$$f_d(I; F) = \max_{dy,dx} (I_{y+dy,x+dx} + F_{dy,dx})  \qquad (Eq. 5)$$

where $f_d$ is the dilation function, I is the image, and F is the dilation filter. The structure of the filter has an effect on the dilation outcome. The filter is defined with the following equation:

$$F(x,y;d,p) = -((2x/d-1)^2 + (2y/d-1)^2)^{p/2} \qquad (Eq. 6)$$

where d is the filter size and p is a tunable parameter that falls in (0,inf).

Figure 11:
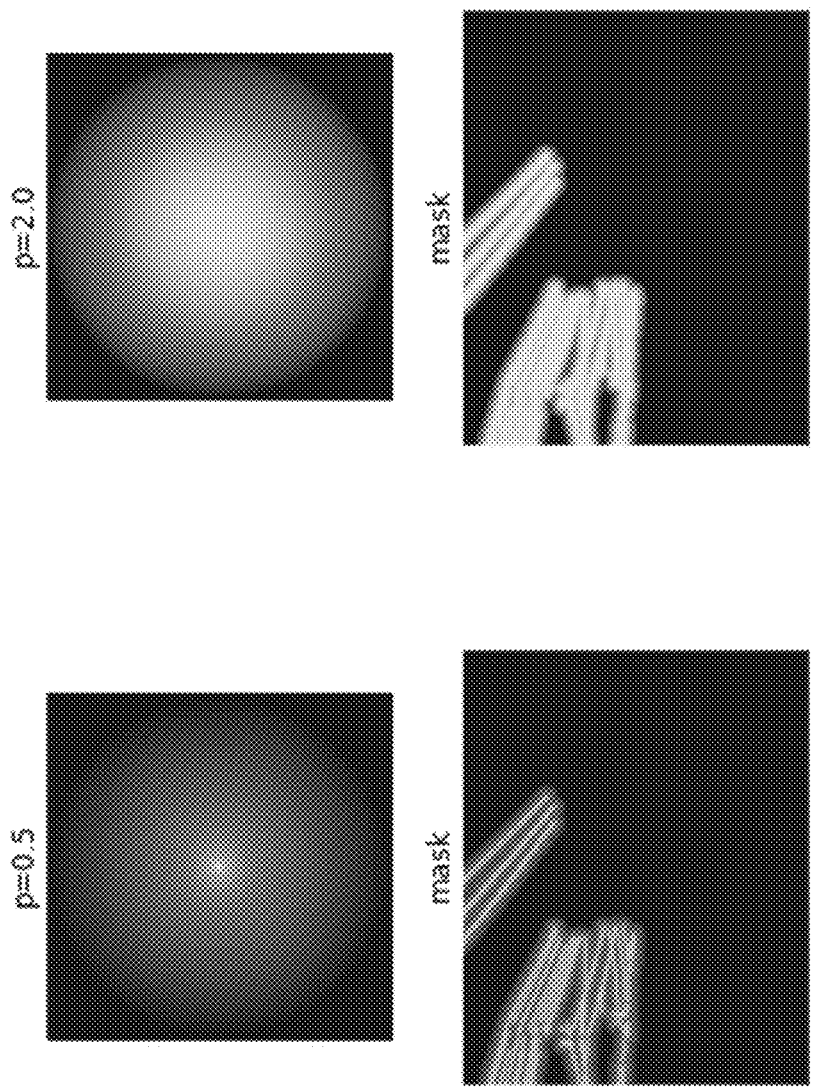
FIG. 11 illustrates changes to segmentation masks based on different dilations, according to some embodiments described herein.

When p is small, the segmentation module 204 produces a large but weak halo; when p is large, the segmentation module 204 produces a strong dilation in the center. FIG. 11 illustrates examples 1100 of segmentation masks with specific p values. When p=0.5, the halo has a weak dilation; when p=2.0, the halo has a strong dilation and the lines of the segmentation mask are less distinct than the lines of the segmentation mask when p=0.5.

In some embodiments, because blurring can mix in the neighboring pixels, and make the power lines less visible, the segmentation module 204 blurs around the powerlines to avoid an easier case for the false positives, such as other cables or fences. The local blur operation can be defined as:

$$f_{lb}(I,M;g) = g(I)M + I(1-M) \qquad (Eq. 7)$$

where $f_{lb}$ is the function for local blur, M is the dilated powerline mask, and g is the blurring function (e.g., Gaussian). FIG. 12 illustrates examples 1200 of an original image and an image with local blurring and a dilated segmentation mask.

In some embodiments, the segmentation module 204 adds negative examples to the training. In some embodiments, the training data includes ¼ negative examples and the classes include trees, fences, and buildings. The segmentation module 204 may increase the quantity and the diversity of the negative examples. The additional classes may include wires, wire rope, barbed wire, wire fencing, picket fences, and fence posts.

In order to avoid a situation where the segmentation module 204 generates a segmentation mask for a power pole on vertical structures that are not power poles, the segmentation module 204 applies heuristics during the inference time. For example, this can cause the segmentation module 204 to eliminate power poles without a powerline attached to them. In some embodiments, the segmentation module 204 runs breadth-first search (BFS) to get connected components. Then, for each power pole component, the segmentation module 204 computes the shortest distance to a powerline. The segmentation module 204 removes the entire pole object if the powerline is too far (this may be a tunable parameter). Assuming there are N pixels and K components, the BFS is O(N). The shortest distance is a bottleneck if the segmentation module 204 iterates the pixel pairs, and the complexity becomes $O(N^2)$. The segmentation module 204 may simplify the objects as rotated boxes, which causes the complexity to reduce to $O(K^2)$.

In some embodiments, the segmentation module 204 stored on a media server 101 is trained with the training data to generate a high-capacity model. The segmentation module 204 then generates a lower-capacity model that includes a more compact neural network model by running inference on a much larger dataset that is segmented by the high-capacity model. In that manner, the high-capacity machine-learning model is distilled to a smaller, i.e., less resource consuming, trained segmentation machine-learning model. The trained segmentation machine-learning model is used by the segmentation modules 204 stored on user devices 115. Because the local operations, such as blur and contrast, are computationally expensive, in some embodiments, the segmentation module 204 precomputes the local operations and adds them to the dataset. The global operation (brightness) is computationally cheap, and so the segmentation module 204 performs that analysis on the fly during training and adds randomness to get variety.

The trained machine-learning model may include one or more model forms or structures. For example, model forms or structures can include any type of neural-network, such as a linear network, a deep-learning neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., an input layer) may receive data as input data or application data. Such data can include, for example, one or more pixels per node, e.g., when the trained model is used for analysis, e.g., of a media item. Subsequent intermediate layers may receive as input, output of nodes of a previous layer per the connectivity specified in the model form or structure. These layers may also be referred to as hidden layers. For example, a first layer may output a segmentation between a foreground and a background. A final layer (e.g., output layer) produces an output of the machine-learning model. For example, the output layer may receive the segmentation of the media item into a foreground and a background and output whether a pixel is part of a segmentation mask or not. In some embodiments, model form or structure also specifies a number and/or type of nodes in each layer.

In different embodiments, the trained model can include one or more models. One or more of the models may include a plurality of nodes, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some embodiments, the computation performed by a node may include applying a step/activation function to the adjusted weighted sum. In some embodiments, the step/activation function may be a nonlinear function. In various embodiments, such computation may include operations such as matrix multiplication. In some embodiments, computations by the plurality of nodes may be performed in parallel, e.g., using multiple processors cores of a multicore processor, using individual processing units of a graphics processing unit (GPU), or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM).

In some embodiments, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using training data, to produce a result.

Training may include applying supervised learning techniques. In supervised learning, the training data can include a plurality of inputs (e.g., manually annotated segments and synthesized media items) and corresponding groundtruth output for each input (e.g., a groundtruth segmentation mask that correctly identifies the one or more distracting objects in the media item). Based on a comparison of the output of the model with the groundtruth output, values of the weights are automatically adjusted, e.g., in a manner that increases a probability that the model produces the groundtruth output for the media item.

In some embodiments, during training the segmentation module 204 outputs a segmentation mask along with a segmentation score that indicates a quality of the segmentation mask that identifies powerlines, power poles, and/or towers in a media item. The segmentation score may reflect an intersection of union (IoU) between the segmentation mask output by the segmentation machine-learning model and a groundtruth segmentation mask. In some embodiments, the segmentation score is a number out of a total number, such as 40/100. Other representations of the segmentation score are possible.

In various embodiments, a trained model includes a set of weights, or embeddings, corresponding to the model structure. In some embodiments, the trained model may include a set of weights that are fixed, e.g., downloaded from a server that provides the weights. In various embodiments, a trained model includes a set of weights, or embeddings, corresponding to the model structure. In embodiments where data is omitted, the segmentation module 204 may include a trained model that is based on prior training, e.g., by a developer of the segmentation module 204, by a third-party, etc. In some embodiments, the trained model may include a set of weights that are fixed, e.g., downloaded from a server that provides the weights.

In some embodiments, the segmentation module 204 receives a media item. The segmentation module 204 provides the media item as input to the trained machine-learning model. In some embodiments, the trained machine-learning model outputs a segmentation mask for one or more distracting objects.

In some embodiments, the machine-learning model outputs a confidence value for each segmentation mask output by the trained machine-learning model. The confidence value may be expressed as a percentage, a number from 0 to 1, etc. For example, the machine-learning model outputs a confidence value of 85% for a confidence that a segmentation mask correctly covered the one or more distracting objects.

In some embodiments, the media item and the segmentation mask are provided as input to the inpainter module 206.

The inpainter module 206 generates an output media item from which the one or more distracting objects are absent (erased from the source media item). In some embodiments, the inpainter module 206 includes a set of instructions executable by the processor 235 to generate the output media item. In some embodiments, the inpainter module 206 is stored in the memory 237 of the computing device 200 and can be accessible and executable by the processor 235.

In some embodiments, the inpainter module 206 receives a segmentation mask from the segmentation module 204. The inpainter module 206 performs inpainting of a portion of the media item that matches the segmentation mask. For example, the inpainter module 206 replaces all pixels within the segmentation mask with pixels that match a background in the media item. In some embodiments, the pixels that match a background may be based on another media item of the same location. In some embodiments, the inpainter module 206 replaces pixels identified by the segmentation mask with pixels that match neighboring regions within the media item.

In some embodiments, the inpainter module 206 trains an inpainting machine-learning model to receive the media item and a segmentation mask from the segmentation module 204 as input and to output an output media item with the one or more distracting objects absent from the output media item.

In some embodiments, the inpainter module 206 generates an inpainting confidence metric that is used to determine a quality of the output media item. In some embodiments, an evaluator (e.g., an evaluation machine-learning model) is used to determine the quality of the output media item. The quality may be based on whether the distracting object was correctly removed (e.g., all of the distracting object and associated features such as shadows were removed) and whether the inpainting is not discernible (e.g., the inpainted region of the output media item blends in with the rest of the media item such that the removal of the distracting object does not result in an inaccuracy that can be perceived).

The user interface module 208 generates a user interface. In some embodiments, the user interface module 208 includes a set of instructions executable by the processor 235 to generate the user interface. In some embodiments, the user interface module 208 is stored in the memory 237 of the computing device 200 and can be accessible and executable by the processor 235.

The user interface module 208 generates a user interface that asks a user for permission to access the user's media items before performing any of the steps performed by the modules in FIG. 2 and the steps described with reference to FIG. 14.

The user interface module 208 generates a user interface that includes a media item and provides a suggestion for removing one or more distracting objects. For example, the user interface may include an outline surrounding each distracting object. In some embodiments, the user interface module 208 generates a suggestion to automatically remove the distracting object if the distracting object is detected with a threshold level of confidence and if the quality of the output media item meets a quality threshold. This can ensure that the user experience of automatic removal of distracting objects is satisfactory.

The user interface module 208 generates a user interface that includes the output media item that was inpainted. In some embodiments, the output media item may be labelled (visually) or marked (in code, e.g., steganographically) to indicate that the output media item was edited to erase the one or more objects. In some embodiments, the user interface includes options for editing the output media item, sharing the output media item, adding the output media item to a photo album, etc. Options for editing the output media item may include the ability to undo the erasure of an object.

In some embodiments, the user interface module 208 receives feedback from a user on the user device 115. The feedback may take the form of a user that posts the output media item, that deletes the output media item, that shares the output media item, etc.

Example Methods

FIG. 13 illustrates a flowchart of an example method 1300 to train a segmentation machine-learning model. The method 1300 of FIG. 13 may begin at block 1302. The method 1300 illustrated in the flowchart may be performed by the computing device 200 in FIG. 2. In some embodiments, the method 1300 is performed by the user device 115, the media server 101, or in part on the user device 115 and in part on the media server 101.

At block 1302, training data is generated that includes a first set of media items and a second set of media items, where the first set of media items correspond to the second set of media items and include distracting objects that are manually segmented. Block 1302 may be followed by block 1304.

At block 1304, a segmentation machine-learning model is trained based on the training data to receive a media item with one or more distracting objects and to output a segmentation mask for one or more segmented objects that correspond to the one or more distracting objects.

Figure 14:
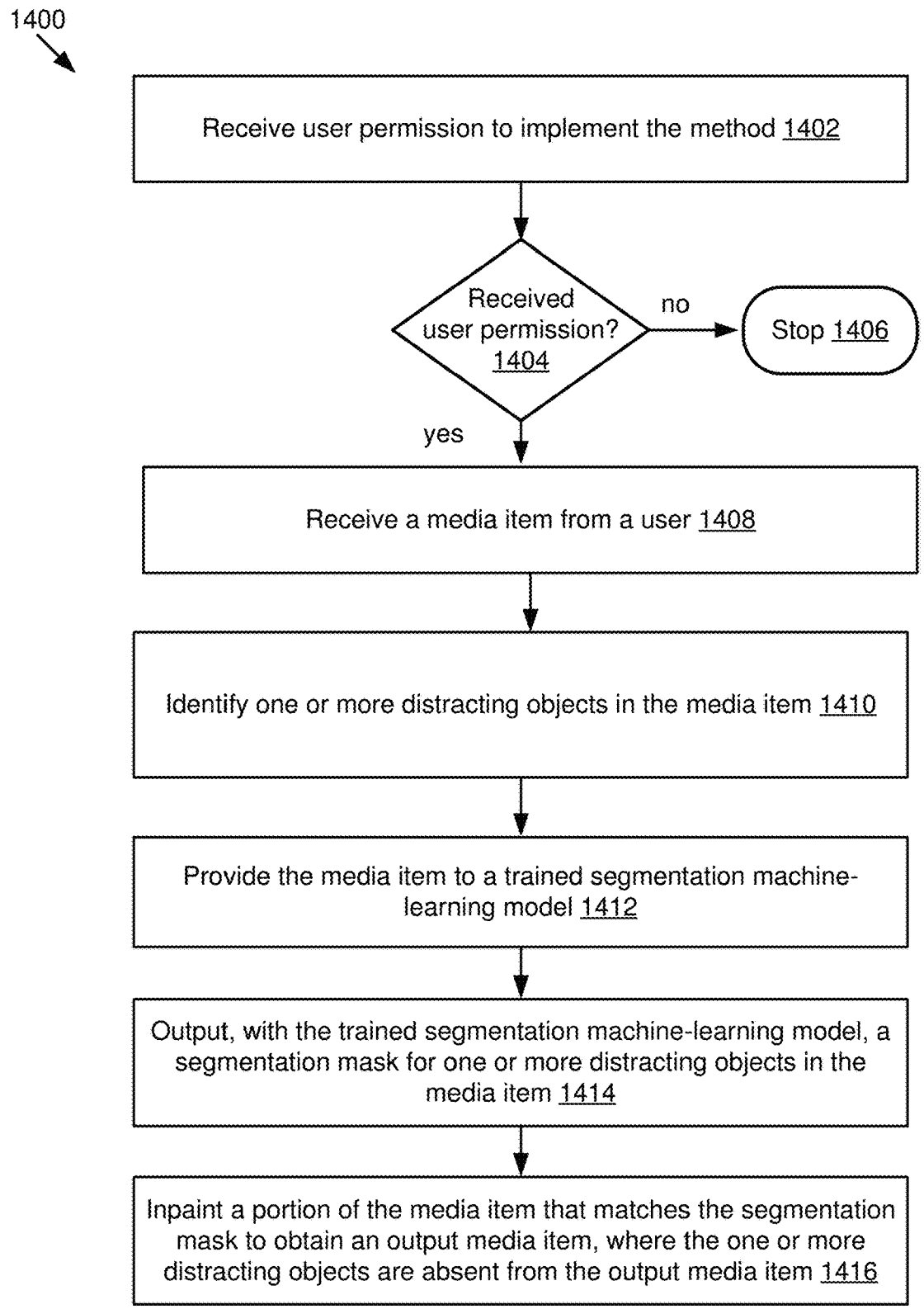
FIG. 14 illustrates a flowchart of an example method to remove a distracting object from a media item, according to some embodiments described herein.

FIG. 14 illustrates a flowchart of an example method 1400 to remove a distracting object from a media item. The method 1400 of FIG. 14 may begin at block 1402. The method 1400 illustrated in the flowchart may be performed by the computing device 200 in FIG. 2. In some embodiments, the method 1400 is performed by the user device 115, the media server 101, or in part on the user device 115 and in part on the media server 101.

At block 1402, user permission is received to implement, the method 1400. For example, a user may load an application in order to view a media item, but before the media item is displayed the user interface asks for user permission to access a media item associated with the user. The user interface may also ask for permission to provide suggestions for the media item, to modify the media item, to enable the user to permit access to only specific media items, to ensure that no media items are stored or transferred to servers without user permission, etc. Block 1402 may be followed by block 1404.

At block 1404, it is determined whether user permission was received. If no user permission was received, block 1404 is followed by block 1406, which stops the method 1400. If user permission was received, block 1404 is followed by block 1408.

At block 1408, a media item is received from a user. For example, the media item includes distracting objects, such as powerlines, power poles, or towers. Block 1408 may be followed by block 1410.

At block 1410, one or more distracting objects are identified in the media item.

Block 1410 may be followed by block 1412.

At block 1412, the media item is provided to a trained segmentation machine-learning model. Block 1412 may be followed by block 1414.

At block 1414, a segmentation mask for the one or more distracting objects in the media item are output with the trained segmentation machine-learning model. Block 1414 may be followed by block 1416.

At block 1416, a portion of the media item that matches the segmentation mask is inpainted to obtain an output media item, where the one or more distracting objects are absent from the output media item.

Further to the descriptions above, a user may be provided with controls allowing the user to make an election as to both if and when systems, programs, or features described herein may enable collection of user information (e.g., information about a user's media items including images and/or videos, social network, social actions, or activities, profession, a user's preferences (e.g., with respect to objects in images), or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art, An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport, the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:
generating training data that includes a first set of media items and a second set of media items, wherein the first set of media items include distracting objects and the second set of media items include manual segmentations of the distracting objects;
identifying one or more original media items in the first set of media items that include one or more broken powerlines;
generating one or more corrected media items that correct the one or more broken powerlines;
generating one or more augmented media items for the training data by blending portions of the one or more corrected media items with portions of respective one or more original media items to increase a randomness of augmentation; and
training a segmentation machine-learning model based on the training data to receive a media item with one or more distracting objects and to output a segmentation mask for one or more segmented objects that correspond to the one or more distracting objects.

2. The method of claim 1, wherein generating the one or more augmented media items includes blending the one or more corrected media items and the respective one or more original media items with a checkerboard mask.

3. The method of claim 1, wherein generating the one or more corrected media items to correct the one or more broken powerlines includes:
modifying a local contrast in the one or more original media items to generate corresponding one or more enhanced media items.

4. The method of claim 3, wherein the local contrast is modified using a gain curve that adds two bias curves together.

5. The method of claim 1, wherein generating training data includes augmenting one or more of the first set of media items by applying a dilation to a segmentation mask of the one or more distracting objects.

6. The method of claim 1, wherein the one or more distracting objects are organized into categories, the categories including at least one selected from a group of powerlines, power poles, towers, and combinations thereof.

7. The method of claim 1, wherein training the segmentation machine-learning model comprises:
generating a first machine-learning model based on the training data; and
distilling the first machine-learning model to a trained segmentation machine-learning model by running inference on the training data that is segmented by the first machine-learning model.

8. The method of claim 1, wherein the training data further includes synthesized images with the distracting objects added in front of outdoor environment objects.

9. A computer-implemented method to remove a distracting object from a media item, the method comprising:
receiving a media item from a user;
identifying one or more distracting objects in the media item;
providing the media item to a trained segmentation machine-learning model;
outputting, with the trained segmentation machine-learning model, a segmentation mask for the one or more distracting objects in the media item; and
inpainting a portion of the media item that matches the segmentation mask to obtain an output media item, wherein the one or more distracting objects are absent from the output media item;
wherein the trained segmentation machine-learning model is trained by generating training data by:
identifying one or more original media items in a first set of media items that include one or more broken powerlines;

generating one or more corrected media items that correct the one or more broken powerlines; and generating one or more augmented media items for the training data by blending portions of the one or more corrected media items with portions of respective one or more original media items to increase a randomness of augmentation.

10. The method of claim 9, wherein the one or more distracting objects are organized into categories, the categories including at least one selected from a group of powerlines, power poles, towers, and combinations thereof.

11. The method of claim 9, further comprising providing a suggestion to a user to remove the one or more distracting objects from the media item.

12. The method of claim 9, wherein the trained segmentation machine-learning model is trained using training data that includes the first set of media items and a second set of media items, wherein the first set of media items include distracting objects and the second set of media items include manual segmentations of the distracting objects.

13. A non-transitory computer-readable medium with instructions stored thereon that, when executed by one or more computers, cause the one or more computers to perform operations, the operations comprising:

generating training data that includes a first set of media items and a second set of media items, wherein the first set of media items include distracting objects and the second set of media items include manual segmentations of the distracting objects;

identifying one or more original media items in the first set of media items that include one or more broken powerlines;

generating one or more corrected media items that correct the one or more broken powerlines;

generating one or more augmented media items for the training data by blending portions of the one or more corrected media items with portions of respective one or more original media items to increase a randomness of augmentation; and training a segmentation machine-learning model based on the training data to receive a media item with one or more distracting objects and to output a segmentation mask for one or more segmented objects that correspond to the one or more distracting objects.

14. The computer-readable medium of claim 13, wherein generating the one or more augmented media items includes blending the one or more corrected media items and the respective one or more original media items with a checkerboard mask.

15. The computer-readable medium of claim 13, wherein generating the one or more corrected media items to correct the one or more broken powerlines includes:

modifying a local contrast in the one or more original media items to generate corresponding one or more enhanced media items.

16. The computer-readable medium of claim 15, wherein the local contrast is modified using a gain curve that adds two bias curves together.

17. The computer-readable medium of claim 13, wherein generating training data includes augmenting one or more of the first set of media items by applying a dilation to a segmentation mask of the one or more distracting objects.

18. The computer-readable medium of claim 13, wherein the one or more distracting objects are organized into categories, the categories including at least one selected from a group of powerlines, power poles, towers, and combinations thereof.

19. The computer-readable medium of claim 13, wherein training the segmentation machine-learning model comprises:

generating a first machine-learning model based on the training data; and distilling the first machine-learning model to a trained segmentation machine-learning model by running inference on the training data that is segmented by the first machine-learning model.

20. The computer-readable medium of claim 13, wherein the training data further includes synthesized images with the distracting objects added in front of outdoor environment objects.

* * * * *